United States Patent
Tori et al.

[11] Patent Number: 5,099,707
[45] Date of Patent: Mar. 31, 1992

[54] DIRECT-ACTING ACTUATOR FOR AN INDUSTRIAL ROBOT

[75] Inventors: Nobutoshi Tori, Hachioji; Susumu Ito, Oshino; Masayuki Hamura, Oshino; Akira Tanaka, Oshino, all of Japan

[73] Assignee: Fanuc Ltd., Minamitsuru, Japan

[21] Appl. No.: 477,872

[22] PCT Filed: Jul. 24, 1989

[86] PCT No.: PCT/JP89/00740
§ 371 Date: Apr. 11, 1990
§ 102(e) Date: Apr. 11, 1990

[87] PCT Pub. No.: WO90/01402
PCT Pub. Date: Feb. 22, 1990

[30] Foreign Application Priority Data
Aug. 11, 1988 [JP] Japan .................. 63-198821

[51] Int. Cl.⁵ .................. F16H 25/20; B25J 11/00
[52] U.S. Cl. .................. 74/89.15; 384/296; 384/439; 403/71; 403/353; 414/744.6; 901/16; 901/17
[58] Field of Search .................. 74/89.15; 403/71, 70, 403/69, 353; 384/295, 296, 438, 439; 901/16, 17; 414/744.6

[56] References Cited
U.S. PATENT DOCUMENTS

| | | | |
|---|---|---|---|
| 3,383,142 | 5/1968 | Scott | 384/295 |
| 4,517,853 | 5/1985 | Tani et al. | 74/89.15 |
| 4,519,723 | 5/1985 | Kusmierz | 403/353 X |
| 4,565,104 | 1/1986 | Akin | 74/89.15 |
| 4,782,761 | 11/1988 | Asberg | 74/89.15 X |
| 4,836,696 | 6/1989 | Okumura et al. | 403/353 X |

FOREIGN PATENT DOCUMENTS

| | | | |
|---|---|---|---|
| 52-14814 | 4/1977 | Japan . | |
| 63-308263 | 12/1988 | Japan | 74/89.15 |
| 1-108414 | 4/1989 | Japan | 384/439 |
| 1-169168 | 7/1989 | Japan | 74/89.15 |
| 66464 | 9/1943 | Norway | 384/438 |

*Primary Examiner*—Allan D. Herrmann
*Attorney, Agent, or Firm*—Staas & Halsey

[57] ABSTRACT

A direct-acting actuator for an industrial robot has an elongate ball screw or feed screw which is attached or detached quickly and safely in a narrow working space. In attaching the ball screw, upper and lower end portions of the ball screw, diagonally inserted in the inside space of a column (10), are respectively fitted into holes (12a, 33a) of a column top plate (12) and a plate member (33) of a slider (30) through a passage (12b), formed in the top plate and opening in a slider-side end face of the same plate, and a passage (33b), formed in the plate member and opening in the distal end face of the same member. Then, the lower end of the ball screw is coupled to a reduction gear (52), and a bearing unit (22) mounted on the upper end of the ball screw and a ball nut (34) threadedly engaged with the ball screw are respectively fitted into the holes (12a, 32a) so that the bearing unit and the ball nut are fixed to the top plate and the plate member, respectively.

13 Claims, 4 Drawing Sheets

DIRECT-ACTING ACTUATOR FOR AN INDUSTRIAL ROBOT

FIELD OF THE INVENTION

The present invention relates to an industrial robot, and more particularly, to a direct-acting actuator in which an elongate feed screw can be attached or detached quickly and safely in a narrow working space.

DESCRIPTION OF THE RELATED ART

Various industrial robots are conventionally known, which comprises a direct-acting or translational actuator. For example, a cylindrical coordinate robot has one swivel or pivotal axis and two translational axes, while a cartesian coordinate robot has three translational axes. A conventional direct-acting actuator, which has a feed screw extending parallel to the translational axes, is so arranged that the feed screw is attached to or detached from the actuator by causing the feed screw to be axially inserted thereinto or axially disengaged therefrom, at the time of assembly, parts replacement, and maintenance of the robot. Thus, the assembly of the robot having the elongate feed screw and other work require a wide working space and a large amount of labor, therefore, operation involves a risk due to the weight of the elongate feed screw.

SUMMARY OF THE INVENTION

An object of the present invention is to provide a direct-acting actuator for an industrial robot, in which an elongate feed screw can be attached or detached quickly and safely even in a narrow working space, at the time of assembly, parts replacement, and maintenance of the robot.

In order to achieve the and other objects according to the present invention, a direct-acting actuator for an industrial robot comprises a feed screw unit including a feed screw disposed parallel to a translational axis of the industrial robot, a drive unit removably coupled to one end of the feed screw for rotatively driving the feed screw, a slider arranged to be movable along the feed screw with rotation of the feed screw, and a column including a plate member for rotatably supporting another end of the feed screw, the plate member being disposed traversely of the feed screw at an end portion of the direct-acting actuator on the side remote from the drive unit, and being formed with a passage extending therethrough and opening in one end face of the plate member and with a hole extending through the plate member and communicating with the passage, another end of the feed screw being removably fitted in the hole through the passage.

As described above, according to the present invention, the one end of the feed screw is removably coupled to the drive unit, and the other end of the feed screw is removably fitted in the hole of the plate member through the passage, which is formed in the plate member disposed traversely of the feed screw, and which opens in the one end face of the plate member. Thus, the feed screw can be attached or detached quickly and safely even in a narrow working space, at the time of assembly, parts replacement, and maintenance of the robot.

DETAILED DESCRIPTION OF THE PREFERRED EMBODIMENTS

First, a conventional robot having translational axes will be described in brief.

Figure 3:
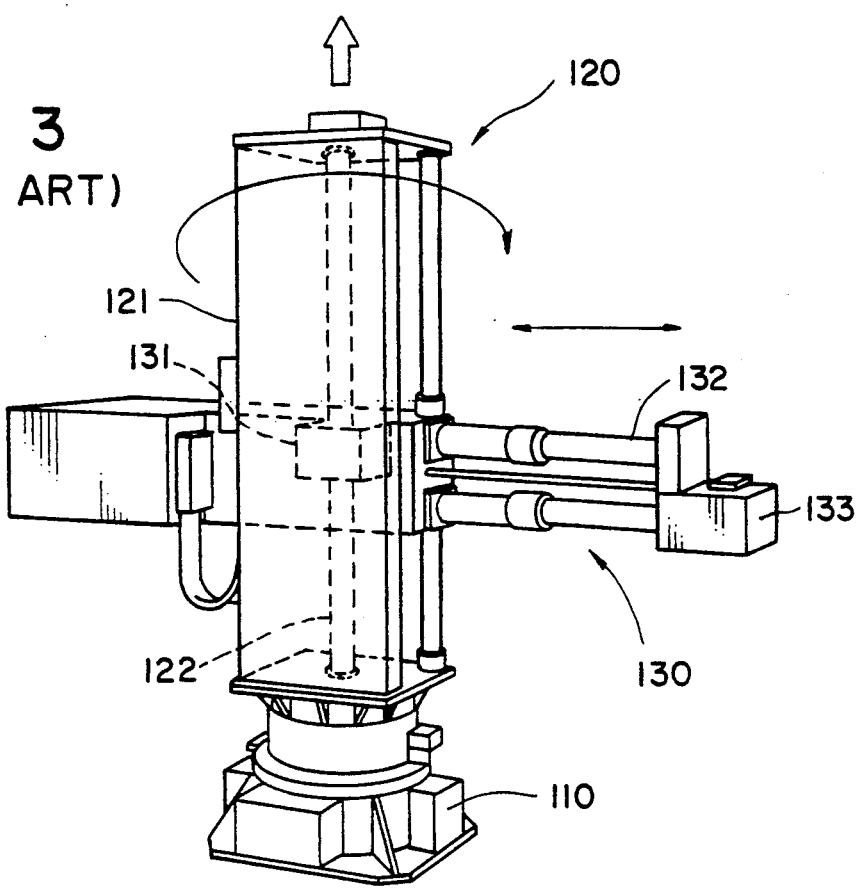
FIG. 3 is a schematic perspective view showing a conventional cylindrical coordinate robot.

A cylindrical coordinate robot of FIG. 3 comprises a first direct-acting actuator 120 which is mounted on a base for rotation around the swivel axis of the robot, and which includes an elongate feed screw 122 rotatably supported by top and bottom walls of a column 121 and removable in the axial direction upwardly. The robot is so arranged as to control the swivel position of the first actuator 120, the vertically moved position of a second direct-acting actuator 130, which includes a slider 131 threadedly engaged with the feed screw 122 and movable along the feed screw, and the horizontal operative position of the actuator 130 thereby positioning an end effector 133 mounted on the distal end of an arm 132, for a required operation.

Figure 4:
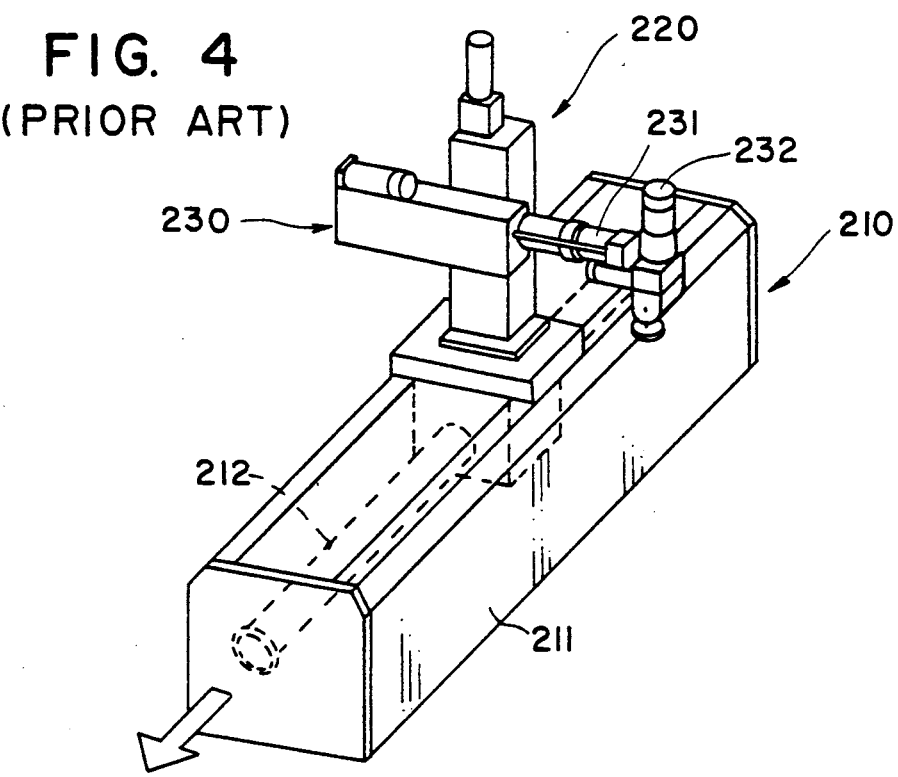
FIG. 4 is a schematic perspective view showing a conventional cartesian coordinate robot.

A cartesian coordinate robot of FIG. 4 comprises a first direct-acting actuator 210 including an elongate feed screw 212 which is rotatably supported by a column 211 and attached to the column 211 in a manner axially removable, i.e., removable toward one side in the horizontal direction. The robot operates to control the horizontally moved position of a second actuator 220 on the feed screw 212, the vertically moved position of a third direct-acting actuator 230 on a feed screw (not shown) of the second actuator 220, and the horizontal operative position of an arm 231, to thereby positioning an end effector 232.

In assembling the robots of FIGS. 3 and 4, the elongate feed screws 122 and 212 are inserted into the columns 121 and 211, respectively, from above the robot or from the one side in the horizontal direction. In replacing or maintaining the feed screws 122 and 212, moreover, the feed screws are drawn out upward or in the horizontal direction. Accordingly, a wide working space and large amounts of labor are required, and the operation involves risk.

Figure 1:
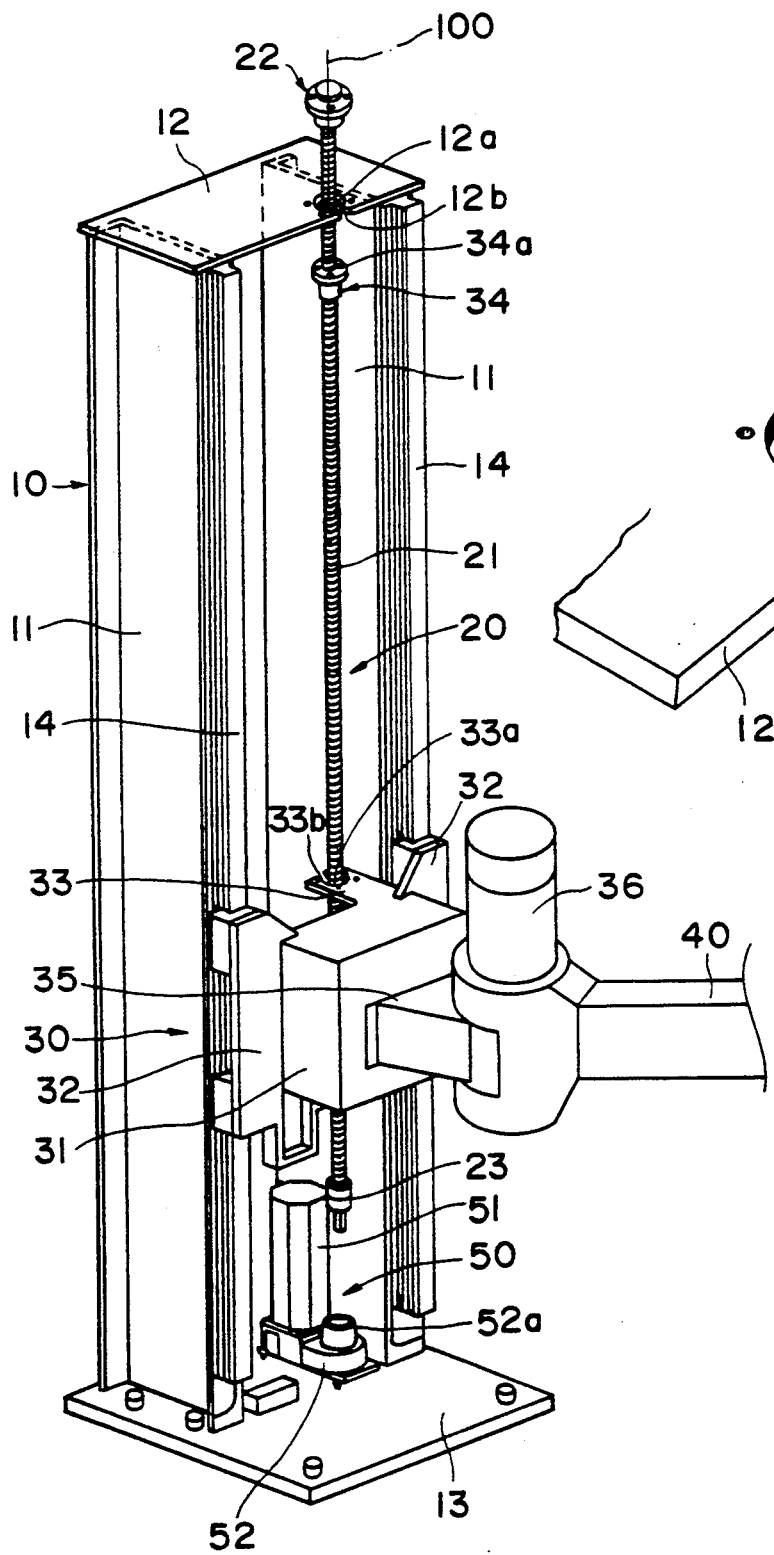
FIG. 1 is a schematic perspective view showing a direct-acting actuator according to a preferred embodiment of the present invention along with its peripheral elements, the actuator being in incomplete assembly.

FIG. 1 shows a direct-acting actuator according to a preferred embodiment of the present invention. This actuator, which is mounted on, e.g., a cylindrical coordinate robot, is so arranged as to reciprocate a slider 30, which supports an arm 40 having an end effector (not shown) mounted on the distal end thereof, along a feed screw 21 of a feed screw unit 20 supported by a column 10.

Figure 2:
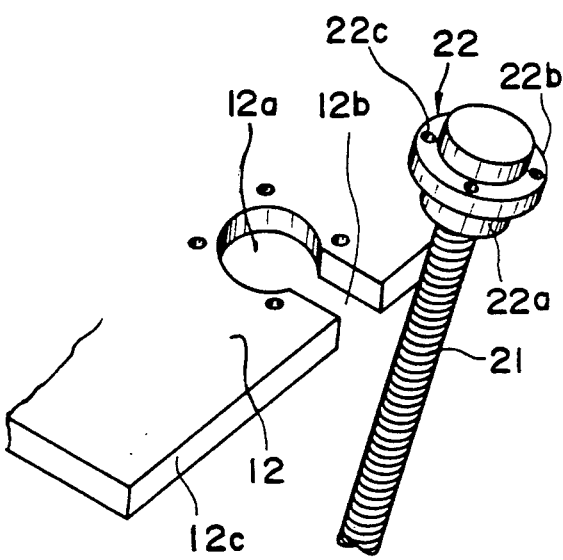
FIG. 2 is a schematic perspective view showing a ball screw of FIG. 1 along with its peripheral elements.
Figure 1A:
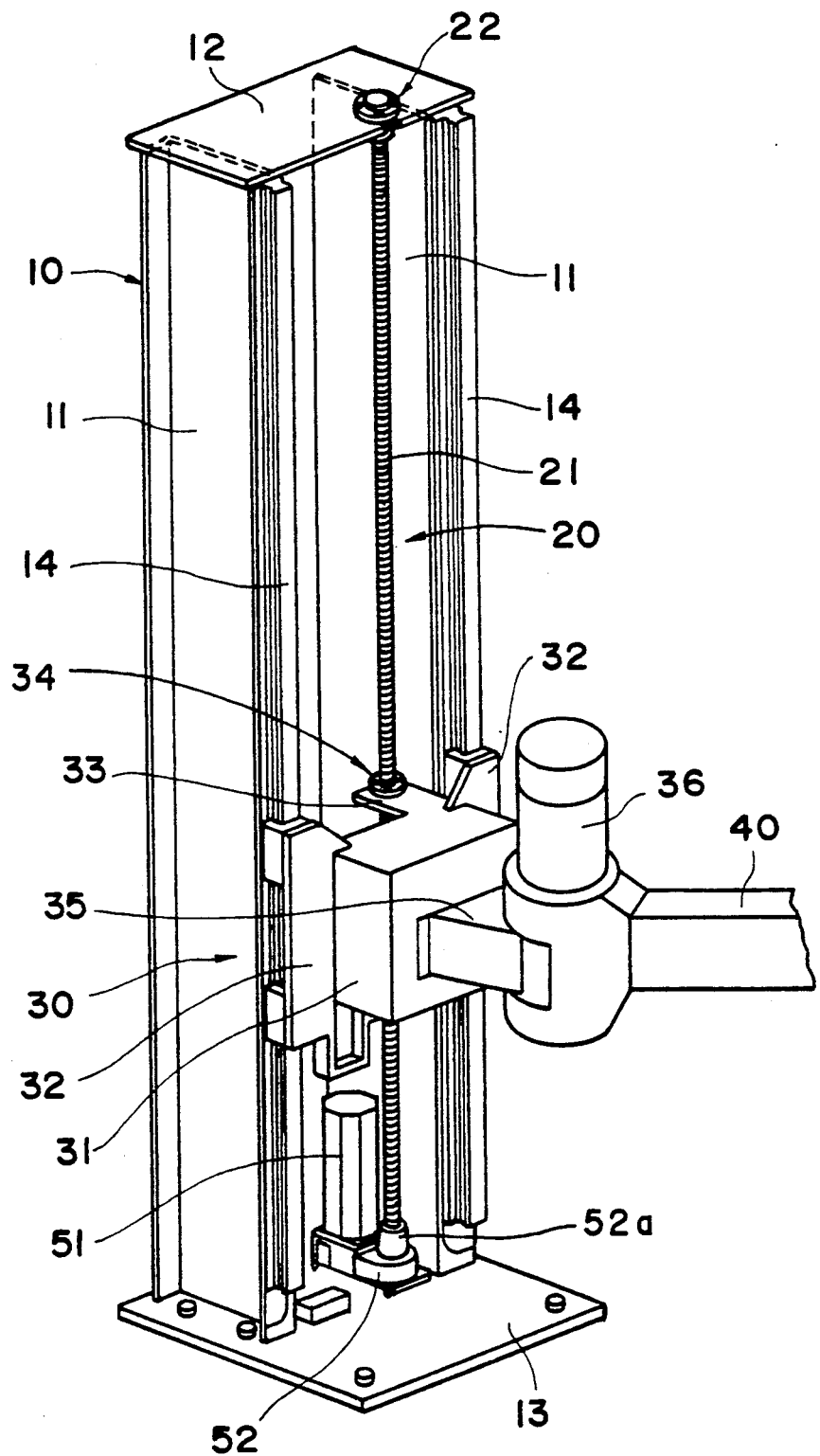
FIG. 1(a) is a schematic view similar to FIG. 1, with parts assembled.

More specifically, the column 10 has a pair of end walls 11 extending parallel to a translational axis 100 of a robot coordinate system and are spaced from each other. The upper and lower ends of each end wall 11 are fixed to a top plate 12 and a base plate 13, respectively. For example, each end wall 11 is formed of channel steel, and top and base plates 12 and 13 are each formed of a steel plate. These elements 11 to 13 are welded to one another at their junctions, so that the column 10 is solid as a whole. As is best shown in FIG. 2, a hole 12a and a passage 12b are formed in that side edge portion of the top plate 12 of the column 10 on the side thereof facing the slider 30 in a manner extending into the top plate 12. The hole 12a is in alignment with the translational axis 100. The outer end of the passage 12b opens in an end face 12c of the top plate 12 on the side thereof facing the slider 30, while the inner end thereof is communicated with the hole 12a. Further, a servomotor 51 is fixed to the upper surface of the base plate 13, and its output shaft (not shown) is connected to the input side of a reduction gear 52 fixed to the base plate 13. The servomotor 51 cooperates with the reduction gear 52 to constitute a drive unit 50 for the translational axis 100. The reduction gear 52 is disposed so that its output-side junction 52a is in alignment with the translational axis 100. The servomotor 51 is connected to a control device (not shown) for controlling the drive of various operating sections of the robot.

Figure 2A:
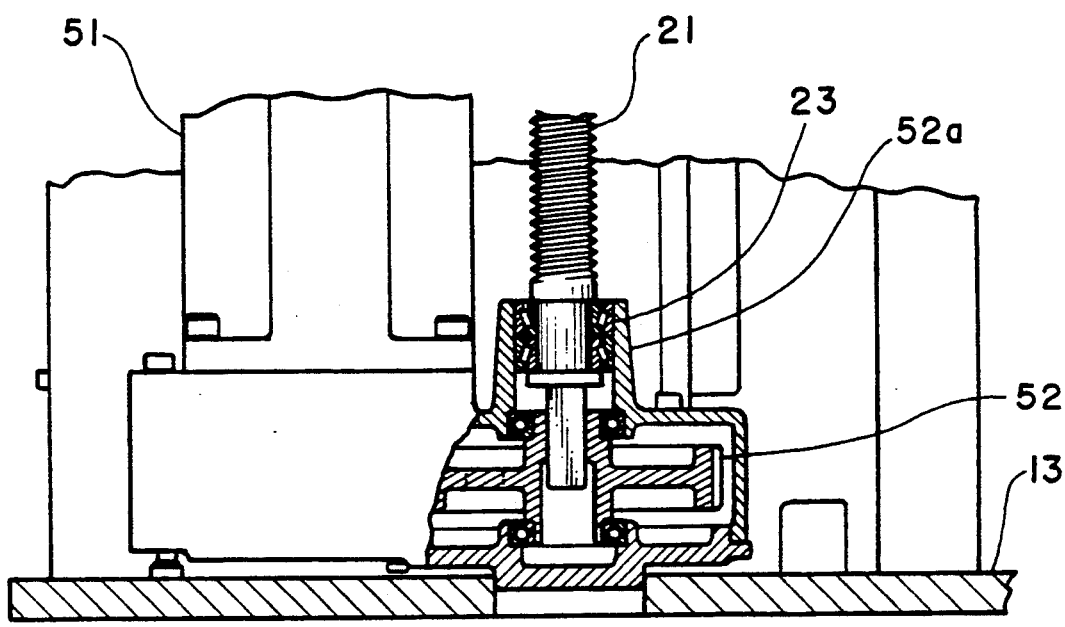
FIG. 2(a) is an enlarged, partial side elevation view, partly in section, of a lower end of the direct-acting actuator of FIG. 1.

The feed screw unit 20 includes a feed screw preferably formed of a ball screw 21. A bearing unit 22, which supports the ball screw 21 in a manner permitting relative rotation and preventing relative axial movement, is attached to the upper end of the ball screw 21, and has a body portion 22a thereof adapted to be removably fitted in the hole 12a of the top plate 12. The ball screw 21 is permitted to pass through the passage 12b of the top plate 12, that is, the width of the passage 12b is slightly greater than the diameter of the ball screw 21. Further, a junction 23 is formed on the lower end of the ball screw 21 for rotation in unison with the ball screw 21. The junction 23 is so arranged to be coupled to the junction 52a of the reduction gear 52 in a manner rotatable in unison therewith and removable in the axial direction. For example, as shown in FIG. 2(a), junction 23 could be a bearing fitted into the junction 52a, which could be a hub formed on a housing that houses the gear 52. The lower, axial end of the ball screw 21 can be fitted into a correspondingly shaped bore formed in the center of the gear 52 so that the ball screw 21 rotates with the gear 52. For example, the end of the ball screw 21 can be square in cross-section and the bore can be correspondingly shaped.

The slider 30 includes a body portion 31 which is integrally formed at opposite sides of a lower portion of the slider body with a pair of guide members 32 projecting outwardly. These two guide members 32 are respectively engaged with a pair of guide rails 14 for sliding motion thereon. The are respectively fixed to the end faces of the paired end walls 11 of the column 10 on the side thereof facing the slider 30. Further, a plate member 33 projecting toward the ball screw 21 and extending across the ball screw 21 is integrally formed with the slider body 31 at a lower part of the same. A hole 33a and a passage 33b, which have functions similar to those of the hole 12a and the passage 12b formed in the top plate 12 of the column 10, are formed at the edge portion of the distal end of the plate member 33 on the side facing the ball screw 21 in a manner extending into the plate member 33, the hole 33a being in alignment with the ball screw 21. The passage 33b has a width slightly greater than the diameter of the ball screw 21, and has the forward end thereof opening to the end face of the plate member 33 on the side facing the ball screw 21, while the inner end thereof is communicated with the hole 33a. The slider 30 further includes a ball nut 34 which is adapted to be fixed to the plate member 33, with the same nut fitted in the hole 33a. A thread to mate with the ball screw 21 is formed on the inner peripheral surface of the ball nut 34. Formed on the top face of the slider body 31 is a support member 35 for supporting the proximal end portion of the arm 40, which member protrudes in the direction away from the ball screw. Thus, the arm 40 is rotatable within a horizontal plane and around a swivel axis which passes through the support member 35 and extends parallel to the translational axis 100. Numeral 36 denotes a servomotor which causes the arm to rotate about the swivel axis.

In the following, procedure of assembling the direct-acting actuator constructed above will be explained.

First, the servomotor 51 and the reduction gear 52 are mounted on the base plate 13 of the column 10. Then, the guide members 32 are fitted individually on the guide rails 14 so that the slider 30 is mounted on the column 10. Then, the ball nut 34 is threadedly engaged with the ball screw 21 so that the bearing unit 22 is fitted on the upper end of the ball screw 21. Subsequently, the lower end portion of the ball screw 21 is diagonally inserted into the inside space of the column 10, and the ball screw 21 is then set upright so that the lower end portion of the ball screw 21 is fitted in the hole 33a through the passage 33b of the plate member 33 of the slider 30, and that the upper end portion of the ball screw 21 is fitted in the hole 12a through the passage 12b of the top plate 12 of the column 10.

Then, the junction 23 at the lower end of the ball screw 21 is fitted onto the junction 52a of the reduction gear 52 from above, and at the same time, the body portion 22a of the bearing unit 22 is fitted into the hole 12a of the top plate 12. Then, a flange 22b of the bearing unit 22 is fixed to the top plate 12 by a suitable means, such as threaded fasteners passing through holes 22c provided in the flange 22b and passing into corresponding holes in the plate 12. Subsequently, the ball nut 34 is manually rotated so that it is lowered along the ball screw 21 to be fitted into the hole 33a of the plate member 33 of the slider 30, and a flange 34a of the ball nut 34 is fixed to the plate member 33 by using a suitable means (not shown), whereupon assembling the direct-acting actuator is completed. Thereafter, the arm 40 and the like are fixed to the slider 30.

Disassembly of the direct-acting actuator for the parts replacement and maintenance of the robot is performed reversely following the aforementioned procedure, and a description of this reverse procedure is omitted herein. In this manner, the assembly and disassembly of the direct-acting actuator, especially the attachment and detachment of the ball screw 21 to and from the column 10, can be effected on the side of the slider 30 of the column 10, so that a wide working space is unnecessary. Since the ball screw 21 need not be moved for a long distance in the vertical direction of the column 10, moreover, the operation can be performed quickly and safely even if the ball screw 21 is long and weighty.

The operation of the direct-acting actuator will now be described in brief.

In operating the robot, the servomotor 52 responds to a control output from the control device of the robot to rotate in a rotational direction corresponding to the control output. The motor rotating force is transmitted to the ball screw 21 through the reduction gear 52, thereby rotating the ball screw, so that the ball nut 34 in engagement with the ball screw and the slider 30 integral therewith are guided along the ball screw 21 by the guide rails 14, to ascend or descend smoothly for a required distance, thereby locating the arm 40 in a required vertical position. A description of the operation of the other operating parts of the robot, such as the servomotor 36, is omitted herein.

The present invention is not limited to the embodiment described above, and various modifications may be effected therein. In connection with the above embodiment, for example, the present invention has been described as being applied to a cylindrical coordinate robot which has a translational axis extending vertically of the robot. Alternatively, however, the present invention may be applied to robots of various types which have one or more translational axes extending in the vertical or horizontal direction. In the above described embodiment, moreover, the feed screw is attached to or detached from the column through the slider-side open lateral face of the column. Alternatively, however, a feed screw passage may be formed in a manner opening in that lateral face of the column on the side thereof remote from the slider or opening in the end-wall-side lateral face thereof, so that the feed screw can be attached or detached on the side of the face in which the passage is formed. In a direct-acting actuator of a type such that the feed screw is disposed within a horizontal plane, a feed screw passage is preferably formed in a manner opening in the top face of the column so that the feed screw can be attached or detached on the top-face side of the column. Alternatively, however, the feed screw may be attached or detached on the sides of any other faces.

We claim:

1. A direct-acting actuator for an industrial robot, comprising:
   a feed screw unit including a feed screw extending parallel to a translational axis of the industrial robot and having first and second opposite axial end portions;
   a drive unit detachably coupled to the first end portion of said feed screw for rotatively driving said feed screw;
   a slider axially movable along said feed screw in response to rotation of said feed screw; and
   a column including a plate member for rotatably supporting the second end portion of said feed screw, said plate member being disposed transversely of the direct-acting actuator on a side thereof remote from said drive unit, said plate member having a passage extending therethrough and opening in one end face thereof and a hole extending through said plate member and communicating with said passage, said feed screw being laterally movable through said passage to position said feed screw in said hole and axially translatable to a position where the second end portion is fitted in said hole and the first end portion is coupled to said drive unit.

2. A direct-acting actuator for an industrial robot according to claim 1, wherein said slider includes a movable member threadedly engaged with said feed screw and a second plate member extending transversely of said feed screw, said second plate member having a second passage extending therethrough and opening in one end face thereof and a second hole extending through said second plate member and communicating with said second passage, said movable member being fitted in said second hole through said second passage.

3. A direct-acting actuator for an industrial robot according to claim 2, wherein said feed screw is a ball screw, and said movable member is a ball nut.

4. A direct-acting actuator for an industrial robot according to claim 1, wherein said feed screw unit includes a bearing unit for supporting said feed screw for relative rotation, said bearing unit being removably fitted in said hole formed in said plate member of said column.

5. A direct-acting actuator for an industrial robot according to claim 2, wherein the passage formed in the plate member of said column opens in a slider-side end face of said plate member, and said second passage formed in said second plate member of said slider opens in a feed-screw-side end face of said second plate member.

6. A direct-acting actuator for an industrial robot according to claim 1, wherein said feed screw is elongated.

7. A direct-acting actuator for an industrial robot according to claim 1, wherein the first end of the feed screw is provided with a first coupling and the drive unit includes a complimentary second coupling axially aligned with the first coupling.

8. A direct-acting actuator for an industrial robot, comprising:
   a feed screw unit including a feed screw extending parallel to a translational axis of the industrial robot and having first and second opposite axial ends portions;
   a drive unit detachably coupled to the first end of said feed screw for rotatively driving said feed screw;
   a slider axially movable along said feed screw in response to rotation of said feed screw; and
   a column including a plate member for rotatably supporting the second end of said feed screw, said plate member being disposed transversely of the direct-acting actuator on a side thereof remote from said drive unit, said plate member having a passage extending therethrough and opening in one end face thereof and a hole extending through said plate member and communicating with said passage, the second end of said feed screw being removably fitted in said hole through said passage,
   wherein said slider includes a movable member threadedly engaged with said feed screw and a second plate member extending transversely of said feed screw, said second plate member having a second passage extending therethrough and opening in one end face thereof and a second hole extending through said second plate member and communicating with said second passage, said movable member being fitted in said second hole through said second passage.

9. A direct-acting actuator for an industrial robot according to claim 8, wherein said feed screw is a ball screw, and said movable member is a ball nut.

10. A direct-acting actuator for an industrial robot according to claim 8, wherein said feed screw unit includes a bearing unit for supporting said feed screw for relative rotation, said bearing unit being removably fitted in said hole formed in said plate member of said column.

11. A direct-acting actuator for an industrial robot according to claim 8, wherein the passage formed in the plate member of said column opens in a slider-side end face of said plate member, and said second passage formed in said second plate member of said slider opens in a feed-screw-side end face of said second plate member.

12. A direct-acting actuator for an industrial robot according to claim 8, wherein said feed screw is long in length.

13. A direct-acting actuator for an industrial robot according to claim 8, wherein the first end of the feed screw is provided with a first coupling and the drive unit includes a complimentary second coupling axially aligned with the first coupling.

* * * * *

UNITED STATES PATENT AND TRADEMARK OFFICE
CERTIFICATE OF CORRECTION

PATENT NO. : 5,099,707

DATED : March 31, 1992

INVENTOR(S) : NOBUTOSHI TORI, SUSUMU ITO, MASAYUKI HAMURA, AKIRA TANAKA

It is certified that error appears in the above-identified patent and that said Letters Patent is hereby corrected as shown below:

Col. 1, line 37, after "invention" insert --above--.

Col. 3, line 52, after "The" insert --rails--.

Signed and Sealed this

Tenth Day of August, 1993

Attest:

MICHAEL K. KIRK

*Attesting Officer*  *Acting Commissioner of Patents and Trademarks*